United States Patent [19]

Sugitani

[11] Patent Number: 4,980,841

[45] Date of Patent: Dec. 25, 1990

[54] BLOCK PROCESSING APPARATUS

[75] Inventor: Kazunori Sugitani, Tokyo, Japan

[73] Assignee: Canon Kabushiki Kaisha, Tokyo, Japan

[21] Appl. No.: 332,366

[22] Filed: Mar. 31, 1989

Related U.S. Application Data

[63] Continuation of Ser. No. 813,230, Dec. 24, 1985, abandoned.

[30] Foreign Application Priority Data

Dec. 29, 1984 [JP] Japan ............ 59-275174
Dec. 29, 1984 [JP] Japan ............ 59-275175
Dec. 29, 1984 [JP] Japan ............ 59-275176
Dec. 29, 1984 [JP] Japan ............ 59-275178

[51] Int. Cl.[5] ............ G06F 3/14

[52] U.S. Cl. ............ 364/518; 364/519; 340/724; 400/118

[58] Field of Search ............ 364/518–521; 340/709, 715, 734, 739, 724; 400/118

[56] References Cited

U.S. PATENT DOCUMENTS 3,757,921 9/1973 Bishop ............ 400/3
4,472,732 9/1984 Bennett et al. ............ 358/93 X
4,539,585 9/1985 Spackova et al. ............ 358/93
4,623,978 11/1986 Aoki ............ 364/519
4,627,015 12/1986 Stephens ............ 364/521 X
4,646,250 2/1987 Childress ............ 364/521 X

FOREIGN PATENT DOCUMENTS 0094494 11/1983 European Pat. Off. .

*Primary Examiner*—Dale M. Shaw
*Assistant Examiner*—H. R. Herndon
*Attorney, Agent, or Firm*—Fitzpatrick, Cella, Harper & Scinto

[57] ABSTRACT

A ruled line block processing apparatus has a ROM, a RAM, a keyboard including a ruled line block key and a breakpoint mark key, a CPU, a character generator, and a printer. The RAM includes areas of a document memory, a block memory, a vertical ruled line table, a small block range table, a value indicating the number of small blocks, a ruled line flag, a ruled line termination flag, a ruled line start flag, and a cursor position memory. Character data read out from the document memory is relocated with ruled lines in a block format in accordance with the small block range table, the number of small blocks, and the breakpoint mark entered in the keyboard at a breakpoint mark position in the character data.

21 Claims, 15 Drawing Sheets

Fig. 5A

あいうえおABCａｂｃアイウ１２たちつてと

Fig. 5B

〔1，4，9〕あいうえお●ABC●ａｂｃ●アイウ●１２●●たちつてと

| | |
|---|---|
| AB<br>C | ａｂｃ |
| アイ<br>ウ | １２ |

たちつてと

| Fig. 9A |
| --- |
| Fig. 9B |

DOCUMENT MEMORY BSM(i) [1,4,91あいうえお●ABC●abc●アイウ●12●●たちつて と

VERTICAL RULED LINE TABLE TKT(p) | 1 | 4 | 9 |

SMALL BLOCK RANGE TABLE SHT(m,n)

| | START POSITION | END POSITION |
|---|---|---|
| FIRST SMALL BLOCK | 2 | 3 |
| SECOND SMALL BLOCK | 5 | 8 |

NUMBER OF SMALL BLOCK SS | 2 |

Fig. 12A

| | 1 | 2 | 3 | 4 | 5 | 6 | 7 | 8 | 9 |
|---|---|---|---|---|---|---|---|---|---|
| 1 | あ | い | う | え | お | | | | |

Fig. 12B

| | | | | | | | | | |
|---|---|---|---|---|---|---|---|---|---|
| 1 | あ | い | う | え | お | | | | |
| 2 | ┌ | ─ | ─ | ┬ | ─ | ─ | ─ | ─ | ┐ |

Fig. 12C

| | | | | | | | | | |
|---|---|---|---|---|---|---|---|---|---|
| 1 | あ | い | う | え | お | | | | |
| 2 | ┌ | ─ | ─ | ┬ | ─ | ─ | ─ | ─ | ┐ |
| 3 | │ | A | B | │ | | | | | │ |
| 4 | │ | C | | │ | | | | | │ |

Fig. 12D

| | | | | | | | | | |
|---|---|---|---|---|---|---|---|---|---|
| 1 | あ | い | う | え | お | | | | |
| 2 | ┌ | ─ | ─ | ┬ | ─ | ─ | ─ | ─ | ┐ |
| 3 | │ | A | B | │ | a | b | c | | │ |
| 4 | │ | C | | │ | | | | | │ |

Fig. 12E

| | | | | | | | | | |
|---|---|---|---|---|---|---|---|---|---|
| 1 | あ | い | う | え | お | | | | |
| 2 | ┌ | ─ | ─ | ┬ | ─ | ─ | ─ | ─ | ┐ |
| 3 | │ | A | B | │ | a | b | c | | │ |
| 4 | │ | C | | │ | | | | | │ |
| 5 | ├ | ─ | ─ | ┼ | ─ | ─ | ─ | ─ | ┤ |

Fig. 12F

| | | | | | | | | | |
|---|---|---|---|---|---|---|---|---|---|
| 1 | あ | い | う | え | お | | | | |
| 2 | ┌ | ─ | ─ | ┬ | ─ | ─ | ─ | ─ | ┐ |
| 3 | │ | A | B | │ | a | b | c | | │ |
| 4 | │ | C | | │ | | | | | │ |
| 5 | ├ | ─ | ─ | ┼ | ─ | ─ | ─ | ─ | ┤ |
| 6 | │ | ア | イ | │ | 1 | 2 | | | │ |
| 7 | │ | ウ | | │ | | | | | │ |
| 8 | └ | ─ | ─ | ┴ | ─ | ─ | ─ | ─ | ┘ |
| 9 | た | ち | つ | て | と | | | | |

BLOCK PROCESSING APPARATUS

This application is a continuation of application Ser. No. 813,230, filed Dec. 24, 1985, now abandoned.

BACKGROUND OF THE INVENTION

The present invention relates to a ruled line block processing apparatus for processing a document with ruled lines.

In a conventional document composing apparatus with a one-line display, a document is edited to be paragraphed in a block format or is ruled, using the following techniques:

(A) The number of characters per line is determined, characters are entered while right and left blocks are formed within a line, and vertical blocks are entered in association with the right and left blocks. When two adjacent blocks are to be separated by a ruled line, a ruled line mark is entered between the characters or an underline is utilized.

(B) Block frames are created and controlled independently of each other for a serial character array.

In conventional technique (A), when document editing (e.g., insertion, deletion or the like) is performed, the block is broken. Editing must then be performed again in accordance with the block format. In technique (B), when editing (e.g., insertion, deletion, or the like) is performed, block sizes become non-uniform. In the worst cases, characters extend outside their corresponding blocks. Therefore, blocking must be performed again.

In a conventional ruled line processing apparatus with a one-line display for composing a document with ruled lines and printing the document, a technique is utilized wherein a document is paragraphed in a block format or two block marks are utilized to determine lateral and vertical positions of the block so as to create a ruled line block document. In the latter case, one of the two block marks has priority over the other. For example, when the lateral mark has priority over the vertical mark, lateral blocking is performed and then vertical sub-blocking is performed. With this technique, it is very convenient to have a character vertical blocking number which is different from the lateral blocking number. However, it is cumbersome to regularly use two different types of marks for frequently used patterns such as "+"-like patterns, the lateral blocking number of w is equal to the vertical blocking number.

Another conventional ruled line processing apparatus with a one-line display has been proposed for ruled line block document composition.

This apparatus uses the one-line display to compose a blocked portion of a document as blocked sentences and a non-blocked portion as ordinary sentences. However, the blocked sentences must be in a block format. Therefore, the blocked sentences cannot be easily separated from the ordinary sentences. Furthermore, some of the ordinary sentences cannot be easily separated from the others and thus cannot be put in block format, if so desired.

SUMMARY OF THE INVENTION

It is an object of the present invention to provide a ruled line block processing apparatus wherein the above-mentioned conventional drawbacks can be avoided, in which a breakpoint mark for dividing a document consisting of one serial character array, and a width indication of tab position are provided to change the character array into a block format. The document and the block format can be integrally composed so as not to break the block format, even if document editing is subsequently performed, or to misalign the ruled line, even if a ruled line is drawn between the blocks.

It is another object of the present invention to provide a ruled line block processing apparatus wherein the above-mentioned conventional drawbacks can be avoided, and only one mark is utilized to vertically and laterally divide a document when it consists of a single serial character array to be changed into a block format.

It is still another object of the present invention to provide a ruled line block processing apparatus wherein the above-mentioned drawbacks can be avoided, and a single mark is used to separate ordinary sentences from a blocked portion of a document consisting of a single serial character array, allowing the ordinary sentences and the block format sentences to be composed and printed.

It is still another object of the present invention to provide a ruled line block processing apparatus wherein the above-mentioned conventional drawbacks can be avoided. A breakpoint mark, for dividing a document consisting of one serial character array, and line position data are provided to change the character array into a block format, so that the document with block format portions can be integrally composed so as not to break the block, even if document editing is subsequently performed, or to misalign the ruled line, even if a ruled line is drawn between the blocks.

BRIEF DESCRIPTION OF THE DRAWINGS

FIGS. 5A to 5E are representations for explaining serial character arrays and ruled line blocks;

FIGS. 11A to 12F are representations for explaining operations of various memories in actual processing of the apparatus of FIG. 2.

DETAILED DESCRIPTION OF THE PREFERRED EMBODIMENTS

Figures 5A, 5B, 5C:
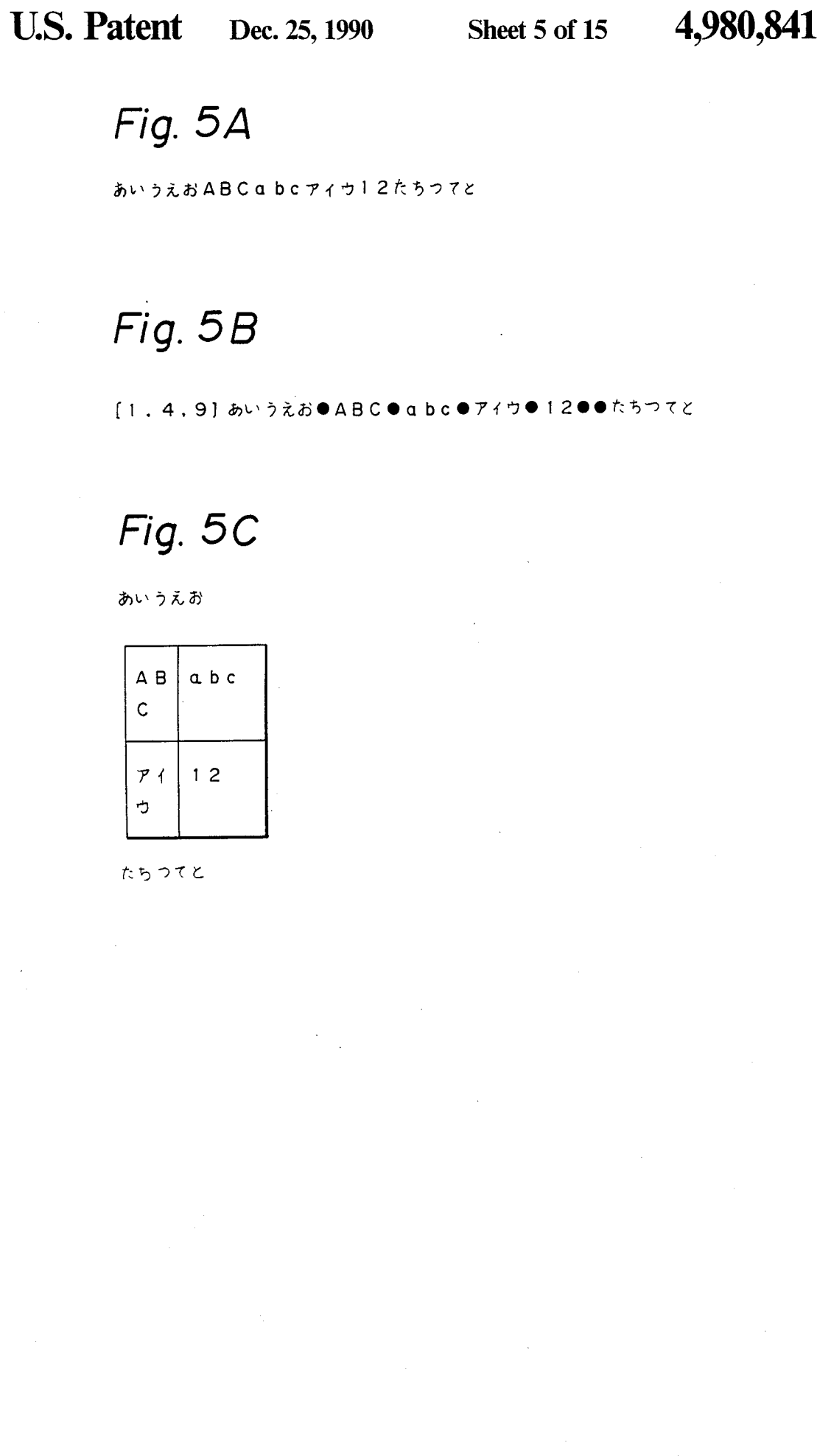

A mode of operation of a rules line block processing apparatus according to an embodiment of the present invention will be described generally hereinafter. A single serial character array is entered by a keyboard, as shown in FIG. 5A. Vertical breakpoint lines (1, 4, 9) are entered at the head of the character array, and breakpoint marks ● are inserted at appropriate positions in the character array, as shown in FIG. 5B. When a ruled line block key is depressed upon completion of the above operation, ruled line blocks can be composed, as shown in FIG. 5C. Characters " 5" up to the first breakpoint mark are given as an ordinary sentence. Characters "● ABC ● abc ● 12 ●●" starting from the next character of the input array through the two successive breakpoint marks are subjected to blocking. The following characters " 5" are again given as an ordinary sentence. The marks also indicate that the blocks are separated by ruled lines. In this example, the tab portions of vertical ruled lines are defined by numbers (1, 4, 9), and the lateral ruled line positions are automatically determined in accordance with the lengths of the respective blocks.

Figure 5D:
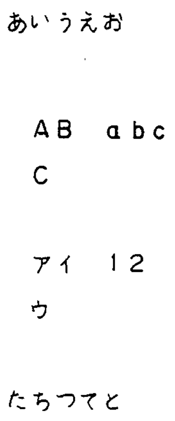
Figure 5E:
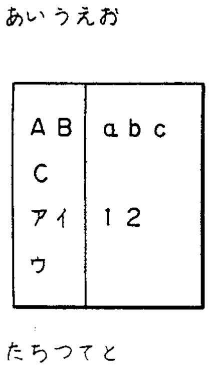

When a ruled line omission key is depressed before the ruled line block key is depressed, blocks are created, but the ruled lines are replaced with spaces, as shown in FIG. 5D. When a ruled line termination key is depressed before the ruled line block key is depressed, the outer ruled lines and the vertical ruled line are left unchanged, and only the lateral ruled line within the blocks is omitted. In this case, the document is shorter than that shown in FIG. 5C by one line.

Figure 2:
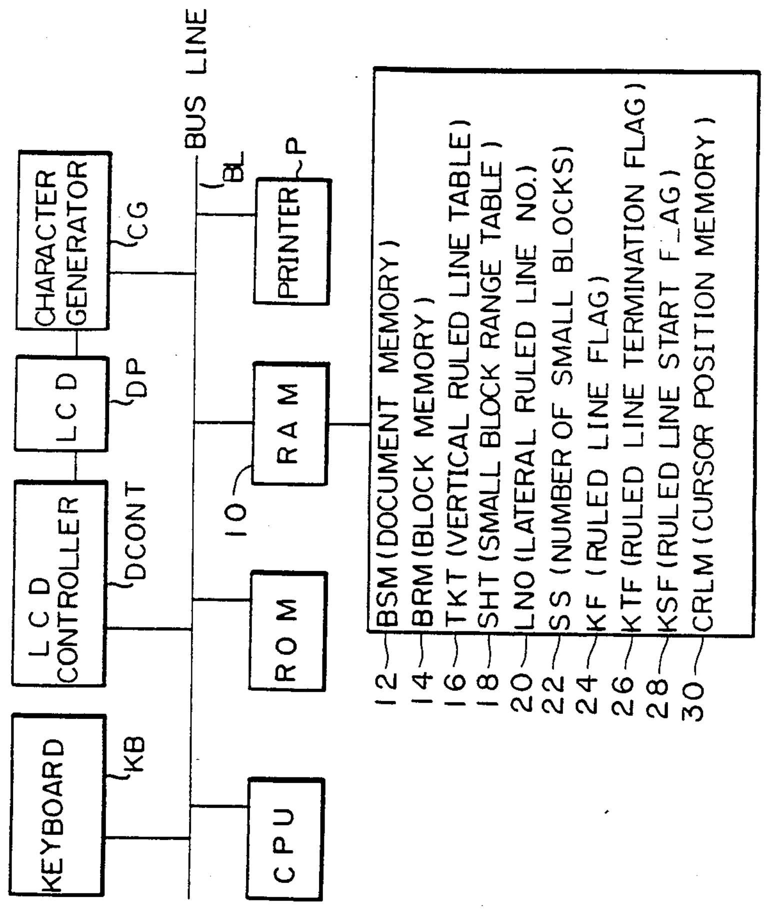
FIG. 2 is a block diagram of a ruled line block processing apparatus according to an embodiment of the present invention.

The present invention will be described in more detail with reference to the accompanying drawings hereinafter. FIG. 2 is a block diagram of a character processing apparatus according to an embodiment of the present invention. A CPU (Central Processing Unit) executes the contents of program steps, shown in FIGS. 6 to 10, prestored in a ROM (Read-Only Memory), and controls respective devices connected thereto through a bus line BL. A keyboard KB is connected to the bus line BL. Character information entered at the keyboard KB is supplied to a document memory BSM12, which is part of a memory RAM (Random Access Memory)10, through the bus line BL. Fonts corresponding to character codes are read out from a character generator CG, controlled by an LCD controller DCONT, and are supplied to a display LCD (Liquid Crystal Display) through the bus line BL under the control of the CPU.

In addition to the area of the document memory BSM12 , the memory RAM10 also has areas of a block memory BRM14, a vertical ruled line table TKT16 representing vertical ruled line positions when blocking is performed, a small block range table SHT18 representing start and end line positions of small blocks (to be described later), a lateral ruled line No. LNO20, and a number SS22 of small blocks, as well as temporary memory areas of a ruled line flag KF24 required for program execution, a ruled line termination flag KTF26, a ruled line start flag KSF28, and a cursor position memory CRLM30. A printer P for printing out contents read out from the block memory BRM14 is also under the control of the CPU.

Figure 3:
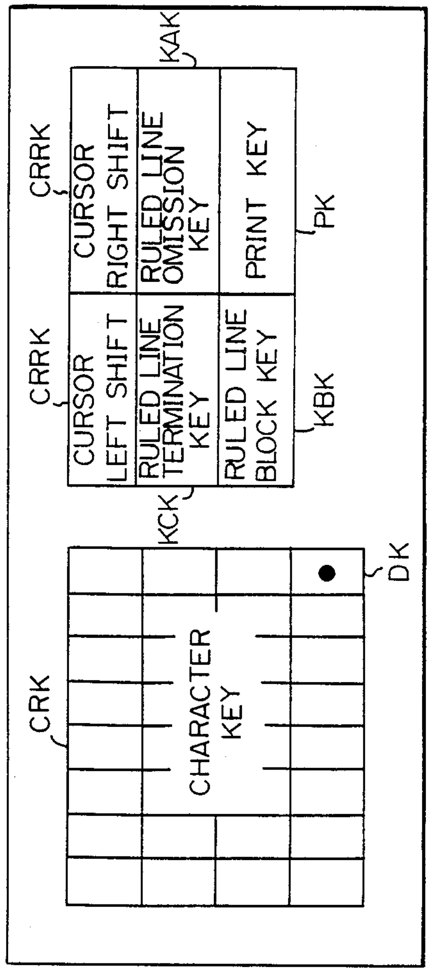
FIG. 3 is a plan view of a keyboard in the ruled line block processing apparatus of FIG. 2.

FIG. 3 is an enlarged plan view of the keyboard KB of FIG. 2. Character keys CRK are used to enter ordinary characters. A character code corresponding to a depressed key is stored in the document memory BSM12 and is displayed on the display LCD. The character keys CRK include a key DK for entering a breakpoint mark and cursor left and right shift keys, used to shift the cursor to the left or right on the display LCD. A ruled line block key KBK is used to compose ruled line blocks from a single serial character array. A ruled line termination key KCK is used to omit the lateral ruled line within the block. A ruled line omission key KAK is used to omit all the ruled lines used for blocking, replacing them with spaces. A print key PK is used to cause the printer P to print the contents of the block memory BRM.

Figure 4:
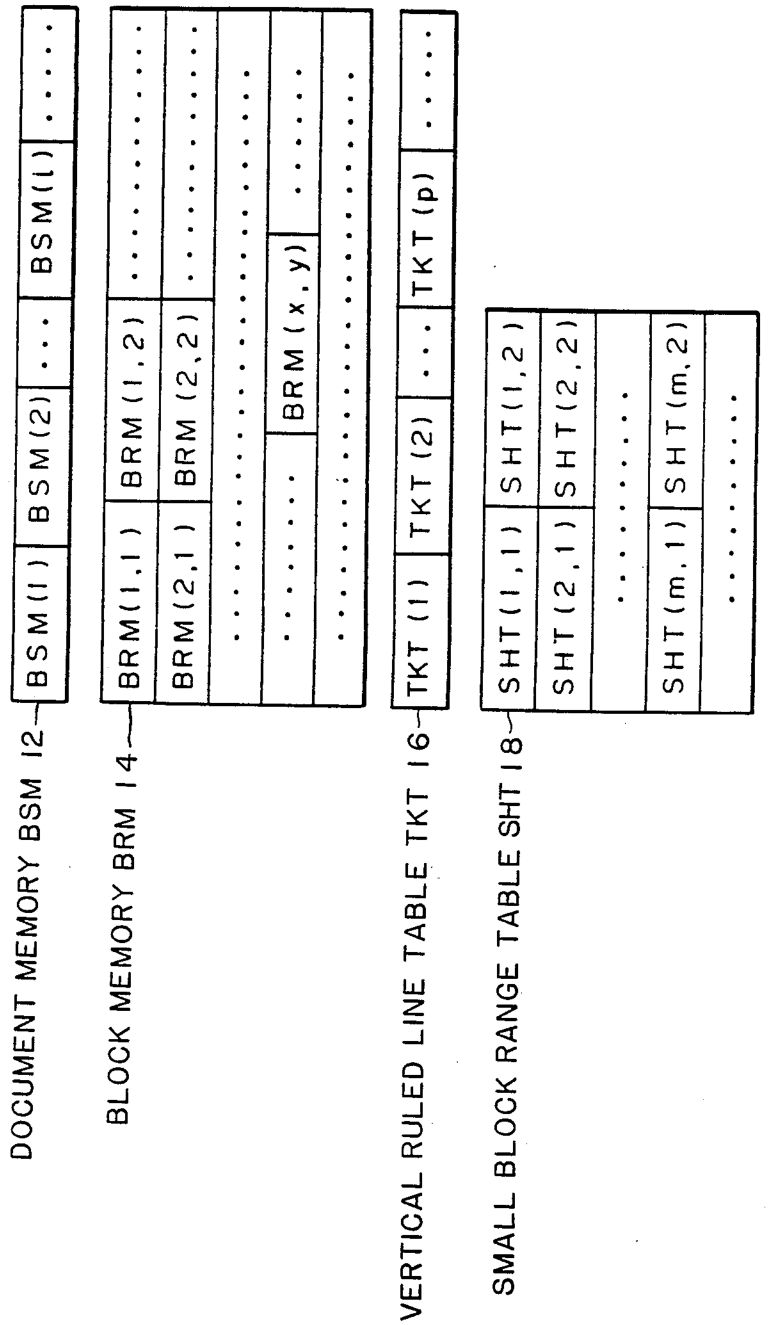
FIG. 4 is a format showing a memory structure in the ruled line, block processing apparatus of FIG. 2.

FIG. 4 shows the formats of the document memory BSM12, the block memory BRM14, the ruled line table TKT16 and the small block range table SHT18 of the memory RAM.

The document memory BSM12 is a memory for serially storing the character information from a start position in accordance with an address order, and is represented as (BSM(1), BSM(2), . . . BSM(i). The block memory BRM14 has a 9×9 matrix structure, is addressed from the start position of the first line, and is represented by (BRM(1,1), BRM(1,2), . . . BRM(x,y). The vertical ruled line table TKT16 is a table for storing the vertical ruled line position and is represented by TKT(1), TKT (2), . . . TKT(p). The small block range table SHT18 is a two-value memory for representing the start and end positions of a transfer range of the block memory BRM14 and is represented by (SHT(1,1), SHT(1,2), SHT(2,1), . . . SHT(m,1) and SHT(m,2).

The operation of the ruled line block processing apparatus will be described with reference to the flow charts of FIGS. 6 to 10, and memory contents in FIGS. 11A to 12F.

Figure 6:
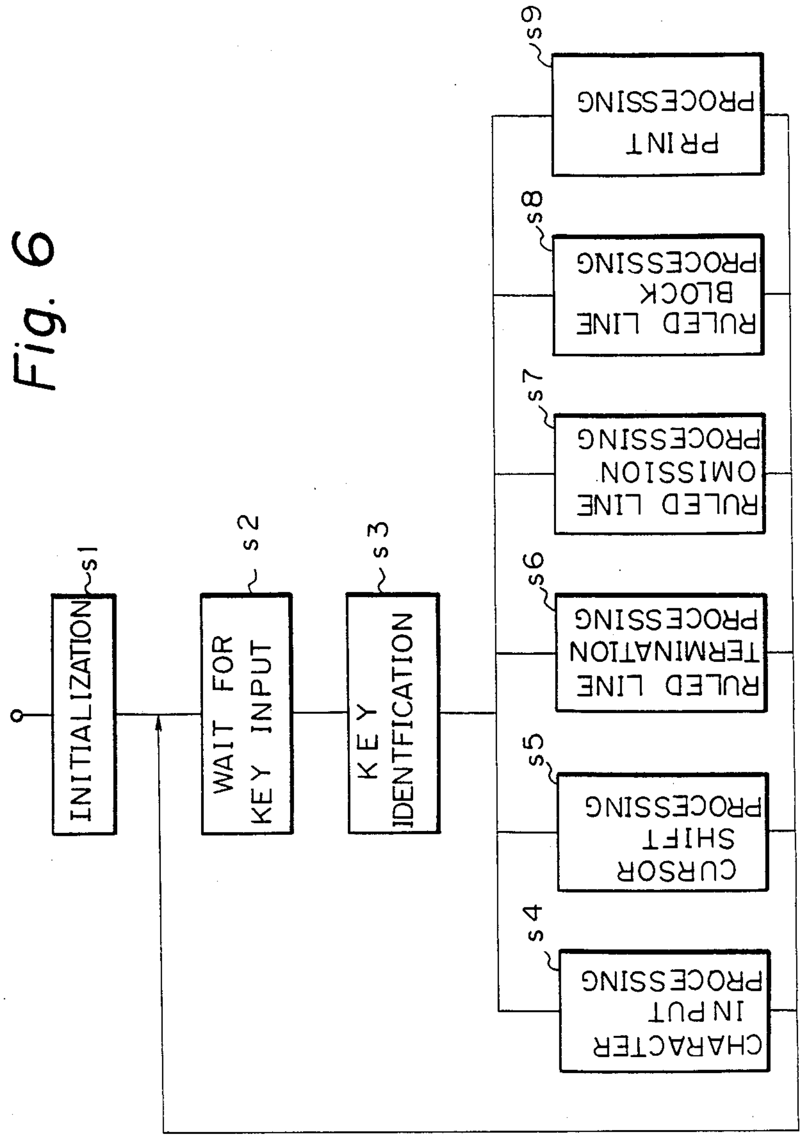
FIGS. 6 to 10 are flow charts for explaining the operation of the ruled line block processing apparatus of FIG. 2.

When the power switch in the apparatus is turned on, step s1 in FIG. 6 is executed. In step s1, the document memory BSM12 and the block memory BRM14 of the RAM10 are cleared. The vertical ruled line table TKT16, the ruled line flag KF24, the ruled line termination flag KTF26, and the ruled line start flag KSF28 are cleared to zero. The cursor is set at the start position of the document memory BSM12, and the cursor position memory CRLM30 is set in the initial state.

Thereafter, in step s2, the CPU wait for key inputs at the keyboard KB, shown in FIG. 3. When the operator depresses any key, the flow advances to step s3, and key discrimination is performed, sc that the flow advances to one of steps s4 to s9.

Step s4 performs processing when a character key is depressed. When the character key is depressed, a character code is stored in the document memory BSM12 corresponding to the cursor position memory CRLM30. Thereafter, the cursor is moved by one, and also the cursor position memory CRLM30 is incremented by one address.

Step s5 performs processing when the cursor right or left shift key is depressed. When the cursor left shift key is depressed, the content of the cursor position memory CRLM30 is decremented by one. However, when the cursor right shift key is depressed, the content of the cursor position memory CRLM is incremented by one.

Step s6 performs processing when the ruled line termination key is depressed. When the ruled line termination key is depressed, the ruled line termination flag KTF26 is updated, i.e., from logic "0" to logic "1" or from logic "1" to logic "0".

Step s7 performs processing when the ruled line omission key is depressed. When the ruled line omission key is depressed, the ruled line flag KF24 in the RAM10 is updated, i.e., from logic "0" to logic "1" or from logic "1" to logic "0".

Step s8 performs processing when ruled line blocks are composed from a content of the document memory BSM12 in FIG. 4, and the blocks are stored in the block memory BRM14. In step s9, the contents of the block memory BRM14 are printed out at the printer P upon depression of the print key PK.

Figure 7A:
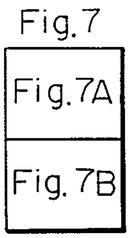
Figure 7A:
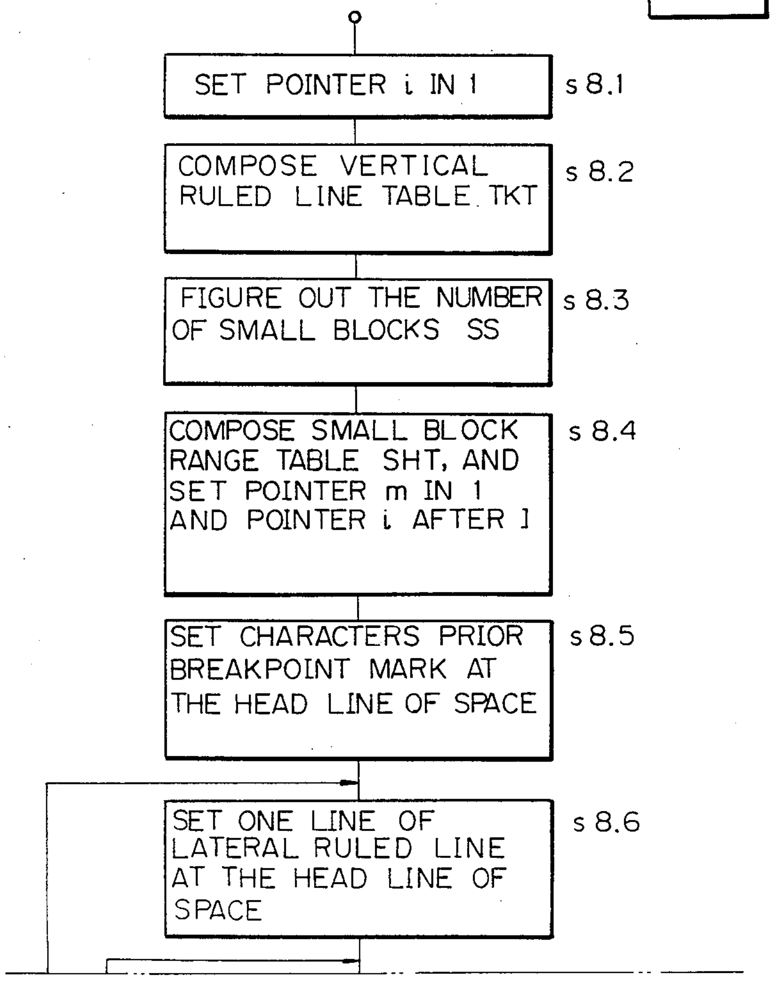
Figure 7B:
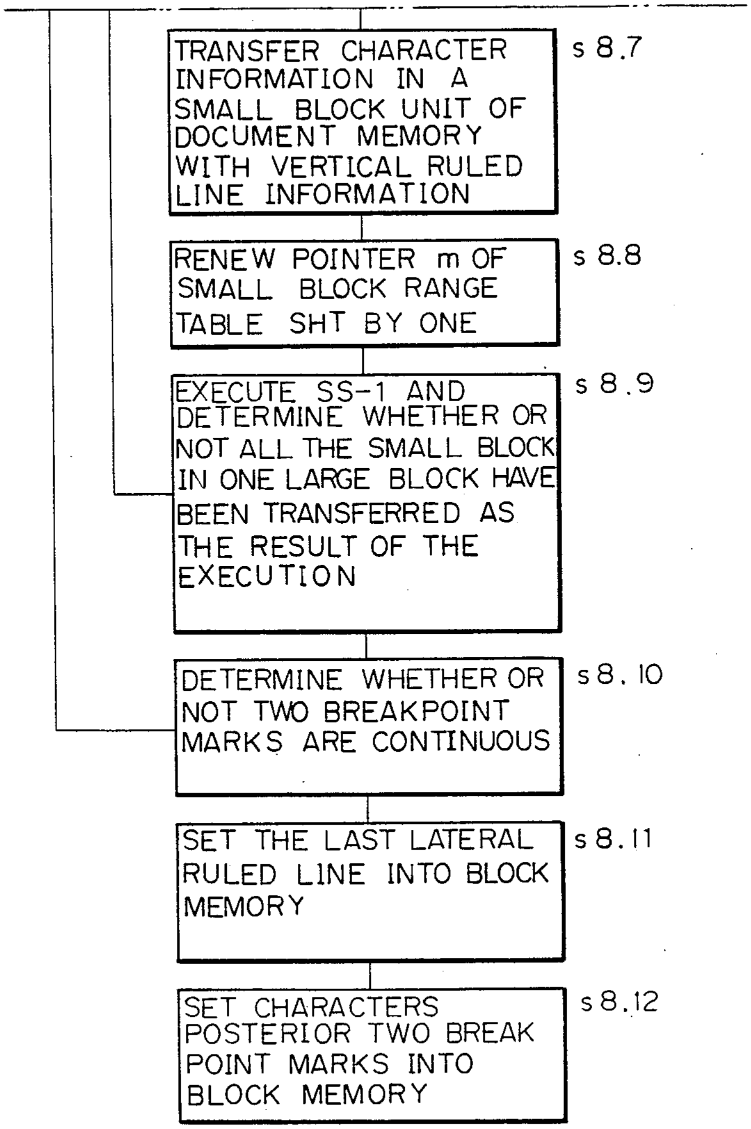

A detailed description of the contents of step s8 is illustrated in FIG. 7. A pointer i in the document memory BSM12 is set at 1 in step s8.1.

Figures 11A, 11B, 11C, 11D:
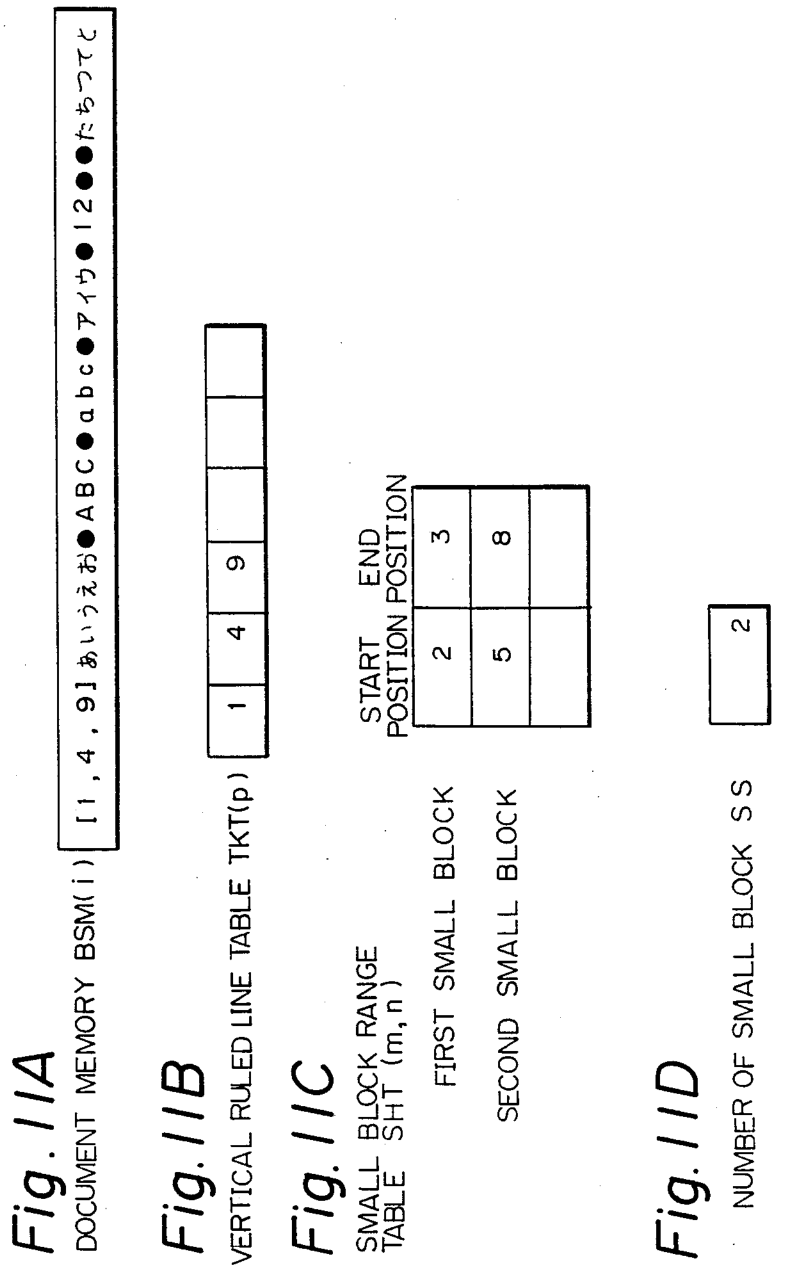

The flow advances to step s8.2, where tab positions of the vertical lines separating the respective blocks are calculated in accordance with block breakpoint mark position data stored at the start position of the document memory BSM12, and the vertical ruled line table TKT16 is created. The line position data is represented by numbers surrounded by brackets [and]. In the case of FIG. 11A, numbers 1, 4 and 9 represent the line position data. In this example, the vertical ruled line table TKT16 is created as shown in FIG. 11B.

The flow then advances to step s8.3, where the number of small blocks aligned in the lateral direction is calculated and is set as the small block No. SS22 in the RAM10. In the example of FIGS. 11A to 11D, the number of small blocks SS22 is two, since the vertical ruled line positions are three, i.e., 1, 4 and 9.

In step s8.4, a small block line range is calculated with reference to the vertical line table TKT16. In the case of FIG. 11B, since three vertical ruled line positions (i.e., 1, 4 and 9) are given, the two small blocks are fitted within the range of tab positions 2 to 3 and tab positions 5 to 8, respectively. This result is rewritten as the small block range table SHT18, as shown in FIG. 11C. Furthermore, a pointer m of the table SHT18 is set at 1 and the pointer i of the document memory BSM12 is set, representing the end position.

In step s8.5, the characters from a character represented by the pointer i, to the first breakpoint mark among the contents of the document memory BSM12, are set in the block memory BRM14.

Figure 8:
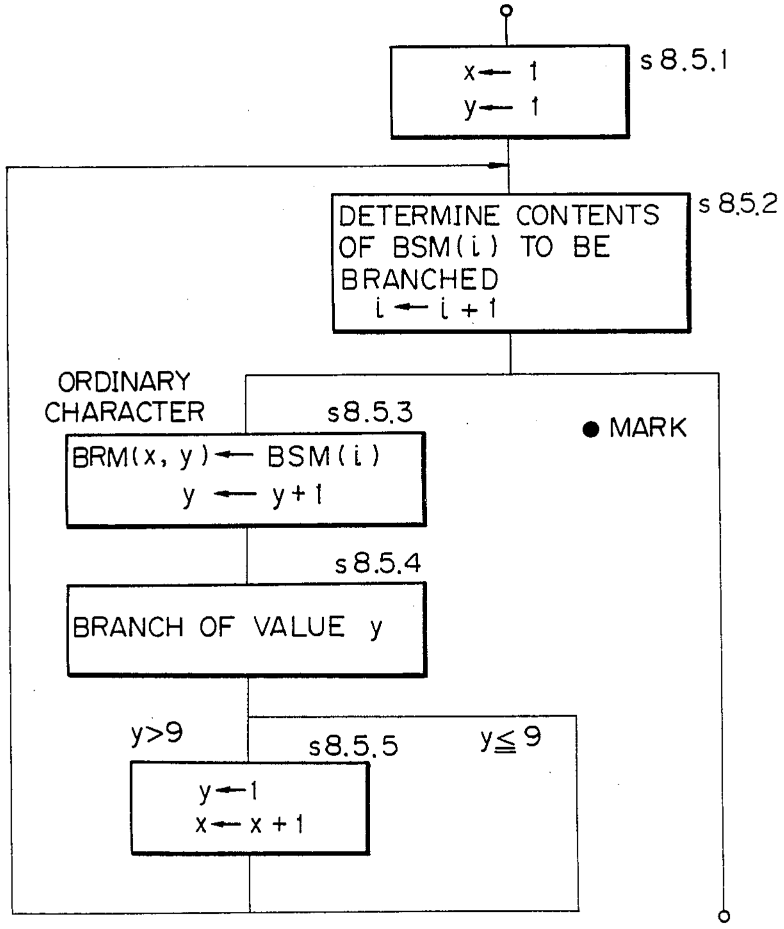
Figures 9, 9A:
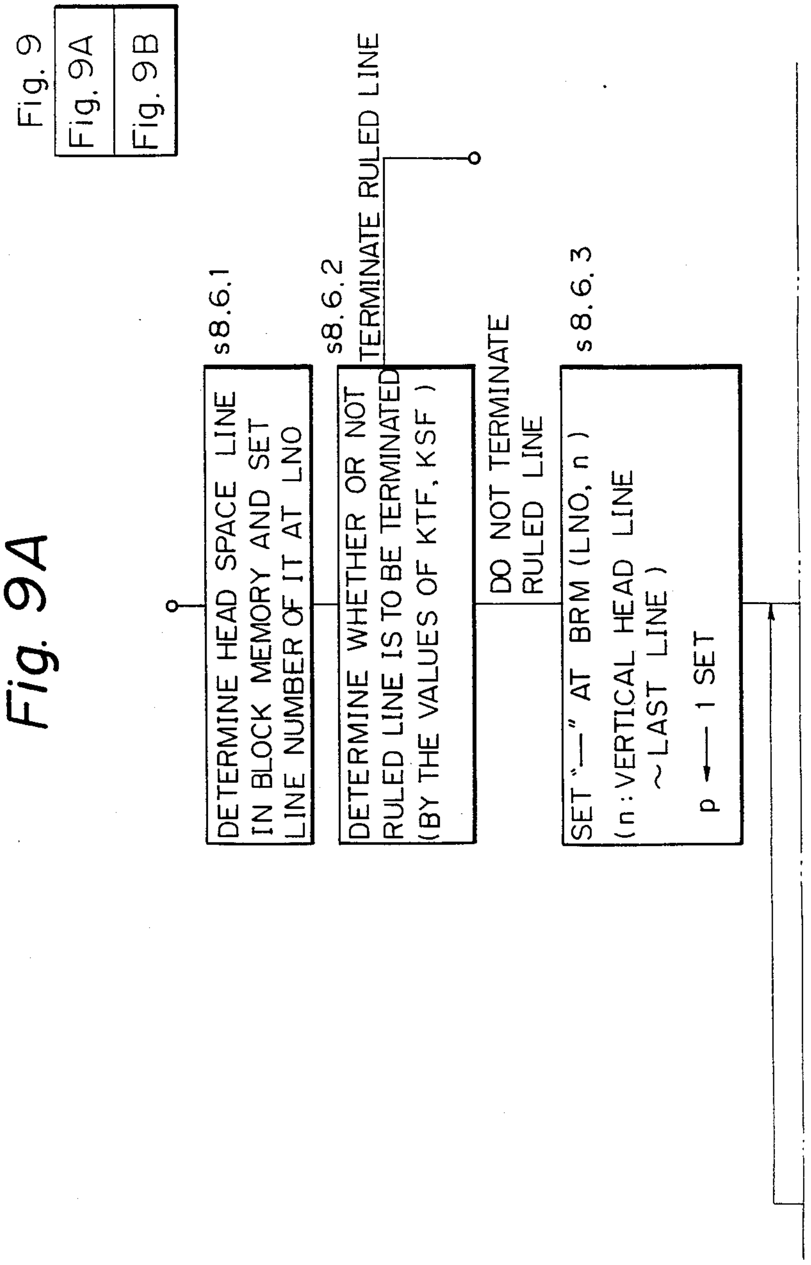
Figure 9B:
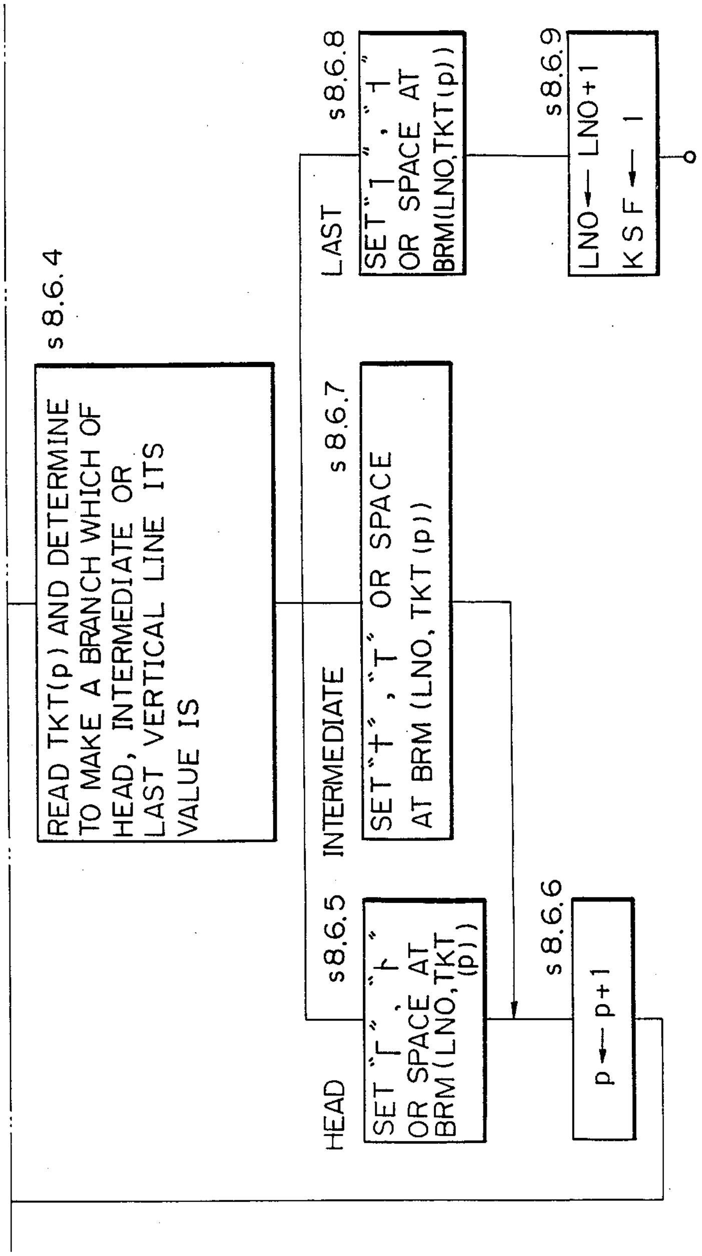
Figure 10:
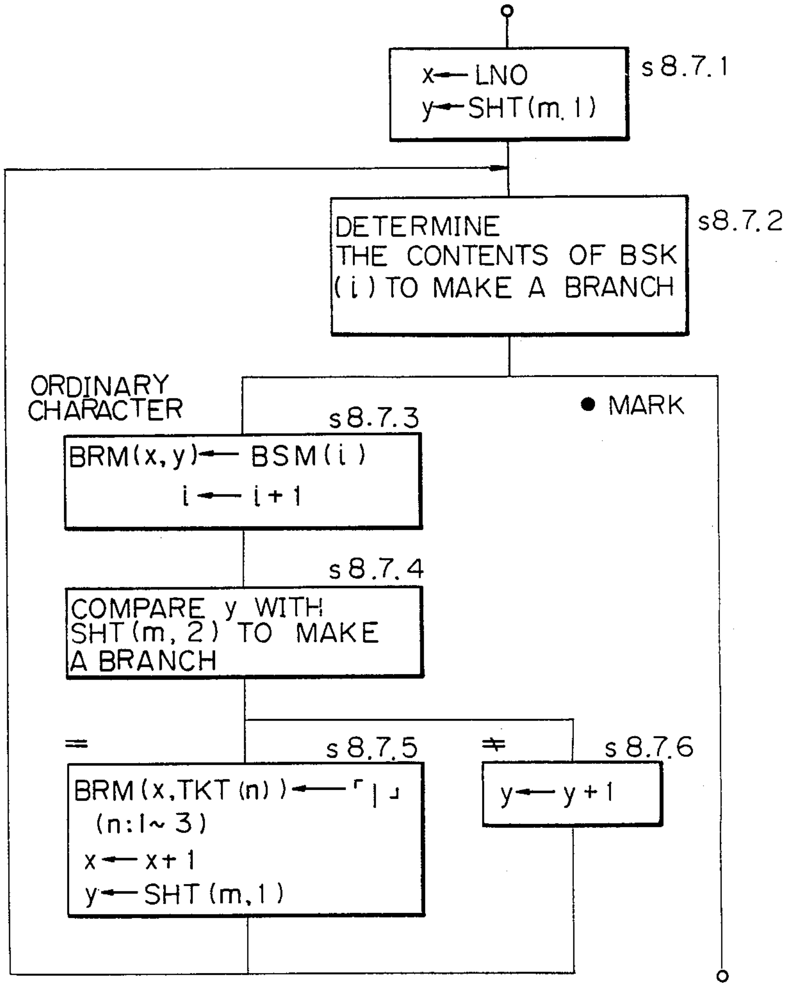

The above operation will be described in detail with reference to the flow chart of FIG. 8. In step s8.5.1, pointers x and y of the block memory BRM14 are set to 1. In step s8.5.2, the content of the document memory BSM is determined to be branched. Before branching, the pointer i is incremented by one. When the CPU determines a breakpoint mark, this routine is ended. However, when the CPU determines an ordinary character, the flow is branched to step s8.5.3, and the content of the document memory BSM12 is transferred to the block memory BRM14. Next, the vertical line pointer y is incremented by one. The flow advances to step s8.5.4, where the value of y is determined and branched. When the CPU determines that y is equal to or smaller than 9, the flow returns to step s8.5.2. However, if the CPU determines that y is larger than 9, the flow advances to step s8.5.5, and y is set at 1, so as to perform line return. The tab position pointer x is then incremented by one. When this processing is completed, the pointer i of the document memory BSM12 is located next to the breakpoint mark ●. Therefore, as shown in FIG. 12A, only characters "  5" are transferred to the block memory BRM.

Referring back to FIG. 7, in step s8.6, lateral ruled line data for one line is set in the block memory BRM14, and the next line value is set in the block line No. LNO20. This processing will be described in detail with reference to FIG. 9.

In step s8.6.1, the contents of the block memory BRM14 are searched for a blank line. Its line No. is set in the block line No. LNO20.

The flow then advances to step s8.6.2, to determine the contents of the ruled line start flag KSF28 and the ruled line termination flag KTF26 in the RAM10. Only when the ruled line start flag KSF28 is "1", i.e., when the intermediate line and the ruled line termination flag KTF26 are set at "1", is the ruled line terminated and this routine ended. Otherwise the flow advances to step s8.6.3, and all lines from the head to the end lines are set by accessing the vertical ruled line table TKT16 in response to the lateral ruled line marks "—". Thereafter, a pointer p in the vertical ruled line table TKT16 is set to 1.

The flow advances to step s8.6.4, where the contents of the vertical ruled line table TKT16 are read out in response to the pointer p and is branched to the one of the head, intermediate, or last vertical lines its value equals. When the contents represent the head line, the flow advances to step s8.6.5.

In step s8.6.5, the mark "  ", "  ", or a space is read out from the character generator CG to a matrix position of the block memory, BRM14 which is defined by the block line No. LNO20 and the TKT16, When the ruled line flag KF24 in the RAM20 is set at "1", all the ruled lines are omitted, so that spaces are inserted in their place. Otherwise, the CPU determines, in accordance with the value of the ruled line start flag KSF28, whether the mark "  " or "  " is set. More specifically, when the ruled line start flag KSF28 is set at "0", no ruled line above the current ruled line is present, so that the mark "  " is set. However, when the ruled line start flag KSF28 is set at "1", the mark "  " is set. Thereafter, the flow advances to step s8.6.6, where the pointer p in the vertical ruled line table TKT16 is incremented by one. The flow returns to step s8.6.4, and the next vertical line position is read out.

When the contents represent an intermediate line in step s8.6.4, the flow advances to step s8.6.7. In step s8.6.7, the mark  ,  , or a space is read out from the character generator CG and is set in the block memory BRM14. Selection of the mark or space pattern is performed in the same manner as in step s8.6.5. Subsequently, the flow advances to step s8.6.6.

When the contents represent the last line in step s8.6.4, the flow advances to step s8.6.8. In step s8.6.8, the mark "  ", "  ", or a space is read out from the character generator CG and is set in the block memory BRM14, in the same manner as in step s8.6.5. When this processing is completed, the flow advances to step s8.6.9, where the block line No. LNO20 is incremented by one, so as to advance to a new block memory line. The ruled line start flag KSF28 is set at "1" to store data that the head ruled line has been completely transferred. Next, the lateral ruled lines, as seen in the second line of FIG. 12B and the fifth line of FIG. 12E, are set in the block memory BRM14. When such processing is completed, the flow advances to step s8.7 in FIG. 7.

In step s8.7, the character array included in the small blocks in the document memory BSM12 is transferred, together with the vertical ruled line data from the table TKT16, to the block memory BRM14. This operation will be described in detail with reference to FIG. 10.

In step s8.7.1, the value of the block line No. LNO20 is set as the lateral pointer x in the block memory BRM14, and the small block range table start position SHT(m,l)18 is set as the vertical pointer y. The flow advances to step s8.7.2, where the document memory BSM12 is accessed, and the flow is branched in accordance with the contents thereof. For ordinary characters, the flow advances to step s8.7.3, and the contents of the document memory BSM12 are transferred to the block memory BRM14. In addition, the pointer i of the document memory BSM12 is incremented by one.

The flow then advances to step s8.7.4, where the vertical pointer y of the block memory BRM14 is compared with the end position SHT(m,2) in the small block range table SHT18. This indicates whether or not small block one line transfer has been completed. When a coincidence is established in step s8.7.4, one-line transfer should have been completed. For example, in FIG. 12C, the third line "AB" has been transferred. In this case, the flow advances to step s8.7.5, where a desired number of vertical ruled lines is set in the transferred line. Subsequently, the lateral pointer x in the block memory BRM14 is incremented by one, and the vertical pointer y is reset to the initial position SHT(m,l). When this processing is completed, the flow returns to step s8.7.2.

If the CPU determines in step s8.7.4 that one-line transfer has not been completed, the flow advances to step s8.7.6, and the vertical pointer y in the block memory BRM14 is incremented by one. The flow then returns to step s8.7.2. The above operation is repeated, so that the data up to "AB" and "C" is transferred, as shown in FIG. 12C.

When a content of the document memory BSM12 is determined to be the breakpoint mark ● in step s8.7.2, only one small-block transfer is completed, and this routine is ended.

Referring back to step s8.8 of FIG. 7, the pointer m in the small block range table SHT is incremented by one. The flow then advances to step s8.9, where a calculation SS-1 is performed. The CPU determines that all the small blocks aligned along the lateral direction are completely transferred to the block memory BRM14. If such transfer is not completed, the flow returns to step s8.7. When transfer is completed, however, the small blocks "ABC" and "abc" are transferred, as shown in FIG. 12D. The flow then advances to step s8.10.

In step s8.10, the pointer i of the document memory BSM12 is incremented by one, and the next content of the document memory BSM12 is fetched by the CPU. The flow is branched in accordance with the content of the document memory BSM12, i.e., whether or not the content represents the breakpoint mark ●. When the CPU determines that the content represents a breakpoint mark ●, and that there are two breakpoints in succession, the flow advances to step s8.11. Otherwise, the flow returns to step s8.6.

Since all block character data is transferred, the ruled line in the last line is transferred to the block memory BRM14 in step s8.11. This processing is the same as that in step s8.6. More particularly, a ruled line pattern "—" is read out from the character generator CG for one line, and the marks "  ", "  " and "  " are also read out therefrom, in accordance with the contents of the vertical ruled line table TKT16. When such processing is completed, the transfer of lines one through eight of FIG. 12F to the block memory BRM14 is also completed.

The flow advances finally to step s8.12, where the character next to the two successive breakpoint marks ●● is transferred as a character of an ordinary sentence to the block memory BRM14. As a result, the transfer of data to the block memory BRM14 is completed.

In the above embodiment, the block memory BRM14 comprises a 9×9 matrix, but the size of the matrix is not limited to this. The display LCD may be replaced with a CRT without departing from the spirit and scope of the invention.

What I claim is:

1. Information processing apparatus comprising:

memory means for storing a sequence of character information;

display means for displaying the sequence of character information stored in said memory means in a first character array format;

processing means connected to said memory means for controlling the sequence of character information stored in said memory means; and print means responsive to the results of control by said processing means for printing the sequence of character information in one of the first character array format and in a second character array format different from the first character array format, wherein said print means prints partition information with the sequence of character information according to the processing of said processing means when the sequence of character information is printed in the second character array format.

2. Information processing apparatus according to claim 1, further comprising format input means for inputting character array format information that determines the array format of the sequence of character information.

3. Information processing apparatus according to claim 2, wherein said memory means is connected to said format input means and stores the character array format information with the sequence of character information.

4. Information processing apparatus according to claim 2, further comprising character input means for inputting the sequence of character information.

5. Information processing apparatus according to claim 4, further comprising keyboard input means which includes said character input means and said format input means.

6. Information processing apparatus according to claim 1, wherein said indication means is a display means for display the sequence of character information stored in said memory means in a first character array format.

7. Information processing apparatus according to claim 1, wherein said memory means stores partition information relating to partitioning the sequence of character information, wherein said indication means comprises display means for displaying the sequence of character information stored in said memory means in a first character array format, wherein said processing means controls the sequence of character information stored in said memory means in accordance with the partition information, and wherein said print means prints line information in accordance with the partition information.

8. Information processing apparatus comprising:

memory means for storing a sequence of character information and partition information partitioning said sequence of character information;

display means for displaying the sequence of character information stored in said memory means in a first character array format;

rearranging means connected to said memory means for rearranging the sequence of character information stored in said memory means in accordance with said partition information; and print means responsive to the results of rearranging by said rearranging means for printing the sequence of character information in a second character array format different from the first character array format and for printing line information in accordance with said partition information.

9. Information processing apparatus according to claim 8, further comprising format input means for inputting formation information that determines the array format of the sequence of character information.

10. Information processing apparatus according to claim 8, further comprising character input means for inputting the sequence of character information.

11. Information processing apparatus according to claim 8, further comprising format input means for inputting format information that determines the array format of the sequence of character information, and character input means for inputting the sequence of character information.

12. Information processing apparatus according to claim 11, further comprising keyboard input means which includes said character input means and said format input means.

13. Information processing apparatus comprising:

memory means for storing a sequence of character information input in a first character array;

processing means connected to said memory means for controlling the sequence of character information stored in said memory means; and print means responsive to the results of control by said processing means for printing the sequence of character information in a second character array different from the first character array.

14. Information processing apparatus according to claim 13, further comprising format input means for inputting character array format information that determines the array format of the sequence of character information.

15. Information processing apparatus according to claim 14, wherein the character array format information input by said format input means is stored in said memory means.

16. Information processing apparatus according to claim 13, further comprising character input means for inputting the sequence of character information.

17. Information processing apparatus according to claim 13, further comprising format input means for inputting format information that determines the array format of the sequence of character information, and character input means for inputting the sequence of character information.

18. Information processing apparatus according to claim 17, further comprising keyboard input means which includes said character input means and said format input means.

19. Information processing apparatus according to claim 13, wherein said memory means stores partition information relation to partitioning of the sequence of character information, wherein said processing means controls the sequence of character information stored in said memory means in accordance with the partition information, and wherein said print means prints the partition information, with the sequence of character information.

20. Information processing apparatus comprising:

format input means for inputting character array format information which determines the array format of a sequence of character information;

memory means for storing the sequence of character information;

processing means connected to said memory means for controlling the sequence of character information stored in said memory means; and print means responsive to the results of control by said processing means for printing the sequence of character information in a matrix array, said print means printing ruled lines indicating the matrix when the sequence character information is printed in the matrix array.

21. Information processing apparatus according to claim 20, wherein said format input means inputs partition information relating to partitioning the sequence of the character information, wherein said memory means stores the partition information, wherein said processing means controls the sequence of character information stored in said memory means in accordance with the partition information stored in said memory means, and wherein said print means prints ruled lines indicating the matrix in accordance with the partition information when the sequence character information is printed in the matrix array.

* * * * *

UNITED STATES PATENT AND TRADEMARK OFFICE

CERTIFICATE OF CORRECTION

PATENT NO. : 4,980,841

DATED : December 25, 1990

INVENTOR(S) : KAZUNORI SUGITANI

It is certified that error appears in the above-identified patent and that said Letters Patent is hereby corrected as shown below:

SHEET 2 OF THE DRAWINGS

Figure 2, "KSF (RULED LINE START F_AG)" should read --KSF (RULED LINE START FLAG)--.

COLUMN 1

Line 49, "w" should read --which--.

COLUMN 2

Line 4, "block format," should read --block format--.
Line 5, "ruled line," should read --ruled line--.
Line 43, "ruled line," should read --ruled line--.
Line 55, "rules" should read --ruled--.
Line 65, "  5" should read -- "あいうえお" --.
Line 67, ""● ABC ● abc ● 12 ●●"" should read --"● ABC ● abc ● アイウ ● 12 ●●"--.

UNITED STATES PATENT AND TRADEMARK OFFICE
CERTIFICATE OF CORRECTION

PATENT NO. : 4,980,841 Page 2 of 4

DATED : December 25, 1990

INVENTOR(S) : KAZUNORI SUGITANI

It is certified that error appears in the above-identified patent and that said Letters Patent is hereby corrected as shown below:

COLUMN 3

Figure 1:
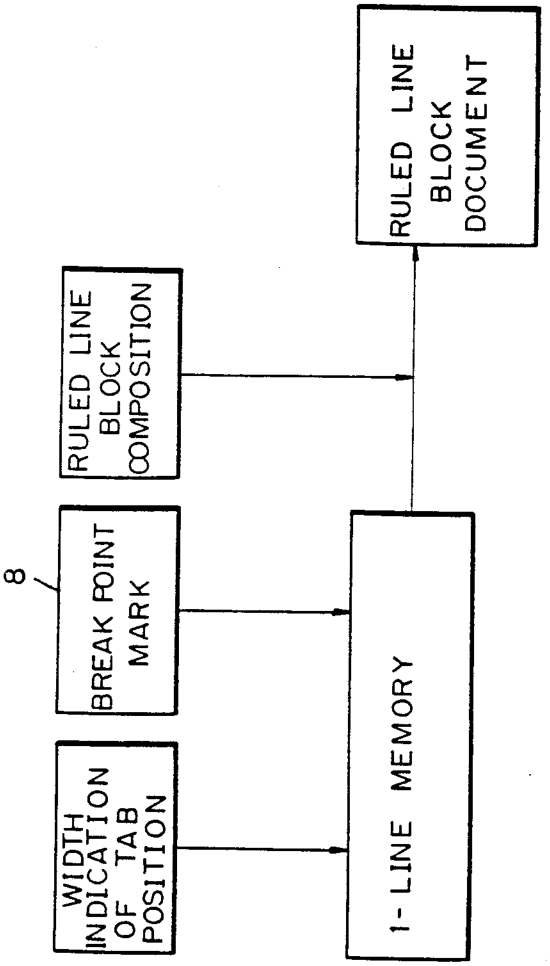
FIG. 1 is a block diagram showing the basic arrangement of a ruled line block processing apparatus according to the present invention.

Line 2, "characters " 5"" should read --characters " たちつてと "--.
Line 3, "The marks" should read --The breakpoint marks--.
Line 64, "memory BRM." should read --memory BRM.
Fig. 1 shows the input of a breakpoint mark 8 and width indication of the tab position into a 1-line memory. The output of the 1-line memory is combined with the specified ruled line block composition to produce a ruled line block document as will be discussed below.--.
Line 68, "memory RAM" should read --memory RAM 10.--.

COLUMN 4

Line 28, "wait" should read --waits--.
Line 31, "sc" should read --so--.

UNITED STATES PATENT AND TRADEMARK OFFICE
CERTIFICATE OF CORRECTION

PATENT NO. : 4,980,841 Page 3 of 4

DATED : December 25, 1990

INVENTOR(S) : KAZUNORI SUGATANI

It is certified that error appears in the above-identified patent and that said Letters Patent is hereby corrected as shown below:

COLUMN 5

Line 21, "set," should read --set],--.
Line 49, "characters " 5"" should read
--characters " あいうえが "--.
Line 65, "Otherwise" should read --Otherwise,--.

COLUMN 6

Line 9, "mark " ", " "," should read
--mark "┌", "├", --.
Line 11, "memory," should read --memory--.
Line 12, "TKT16," should read --TKT16.--.
Line 13, "RAM20" should read --RAM10--.
Line 17, "mark " " or " "" should read
--mark "┌" or "├" --.
Line 20, "mark " "" should read --mark "┌" --.
Line 21, "mark " "" should read --mark "├" --.

--mark "┌" or "├" --.
Line 35, "mark " ", " "" should read
--mark "┐", "┤", --.

UNITED STATES PATENT AND TRADEMARK OFFICE

CERTIFICATE OF CORRECTION

PATENT NO. : 4,980,841 Page 4 of 4

DATED : December 25, 1990

INVENTOR(S) : KAZUNORI SUGITANI

It is certified that error appears in the above-identified patent and that said Letters Patent is hereby corrected as shown below:

COLUMN 7

Line 46, "marks "  ", "  " and "  "" should read --marks "└", "⊥" and "┘" --.

COLUMN 8

Line 35, "display" should read --displaying--.

COLUMN 10

Line 9, "relation" should read --relating--.
Line 16, "tion," should read --tion--.

Signed and Sealed this

Tenth Day of November, 1992

*Attest:*

DOUGLAS B. COMER

*Attesting Officer*

*Acting Commissioner of Patents and Trademarks*

UNITED STATES PATENT AND TRADEMARK OFFICE
CERTIFICATE OF CORRECTION

PATENT NO. : 4,980,841

DATED : December 25, 1990

INVENTOR(S) : KAZUNORI SUGITANI

It is certified that error appears in the above-identified patent and that said Letters Patent is hereby corrected as shown below:

COLUMN 6

Line 28, "mark , ," should read --mark +,T,--.

Signed and Sealed this

First Day of June, 1993

Attest:

MICHAEL K. KIRK

*Attesting Officer*

*Acting Commissioner of Patents and Trademarks*